US012756087B2

(12) United States Patent
Kajikiya et al.

(10) Patent No.: US 12,756,087 B2
(45) Date of Patent: Oct. 6, 2026

(54) ANTENNA DEVICE AND IC CARD HAVING THE SAME

(71) Applicant: TDK Corporation, Tokyo (JP)

(72) Inventors: Shoma Kajikiya, Tokyo (JP); Toshio Tomonari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 19/002,725

(22) Filed: Dec. 27, 2024

(65) Prior Publication Data

US 2025/0219281 A1 Jul. 3, 2025

(30) Foreign Application Priority Data

Dec. 28, 2023 (JP) ................................ 2023-222334

(51) Int. Cl.
*G06K 19/077* (2006.01)
*H01Q 1/22* (2006.01)
*H01Q 7/00* (2006.01)

(52) U.S. Cl.
CPC ..... *H01Q 1/2216* (2013.01); *G06K 19/07773* (2013.01); *H01Q 7/00* (2013.01)

(58) Field of Classification Search
CPC .................. G06K 19/07773; G06K 19/07794
USPC ........................................................ 235/492
See application file for complete search history.

(56) References Cited

U.S. PATENT DOCUMENTS

2014/0209691 A1* 7/2014 Finn ...................... H01F 27/363 235/492
2018/0341846 A1 11/2018 Finn et al.
2021/0150294 A1* 5/2021 Finn .................... G06K 19/045

FOREIGN PATENT DOCUMENTS

JP 2022-048179 A 3/2022

* cited by examiner

*Primary Examiner* — Toan C Ly
(74) *Attorney, Agent, or Firm* — XSENSUS LLP

(57) ABSTRACT

Disclosed herein is an antenna device that includes a metal plate having a through hole, a first coil wound along the through hole and having an opening that overlaps the through hole, and a second coil wound along an outer edge of the metal plate and connected to the first coil. The edge of the through hole includes a first edge positioned on one side in a first direction as viewed from a center of the first through hole and a second edge positioned on another side in the first direction as viewed from the center of the first through hole. The first edge has a first protruding part protruding toward the second edge and overlapping a winding area of the first coil. The second edge has a second protruding part protruding toward the first edge and overlapping the winding area of the first coil.

19 Claims, 13 Drawing Sheets

ANTENNA DEVICE AND IC CARD HAVING THE SAME

CROSS-REFERENCE TO RELATED APPLICATION

This application claims the benefit of Japanese Patent Application No. 2023-222334, filed on Dec. 28, 2023, the entire disclosure of which is incorporated by reference herein.

BACKGROUND

The present disclosure relates to an antenna device and an IC card having the same.

US 2018/0341846 discloses an IC card provided with a metal plate having a through hole and an IC module accommodated in the through hole.

In the IC card described in US 2018/0341846, the IC module is mounted at a step part of the metal plate formed around the through hole. This poses a problem that communication characteristics deteriorate due to the influence of the step part.

SUMMARY

The present disclosure describes a technology for preventing, in an antenna device applicable to an IC card, deterioration in communication characteristics due to the presence of a metal plate.

An antenna device according to an embodiment of the present disclosure includes: a metal plate having a first through hole; and a coil including first and second coils, the first coil being wound along the first through hole and having an opening that overlaps the first through hole, the second coil being wound along the outer edge of the metal plate and connected to the first coil. The edge of the first through hole includes a first edge positioned on one side in a first direction as viewed from the center of the first through hole and a second edge positioned on the other side in the first direction as viewed from the center of the first through hole. The first edge has a first protruding part protruding toward the second edge and overlapping the winding area of the first coil, and the second edge has a second protruding part protruding toward the first edge and overlapping the winding area of the first coil.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
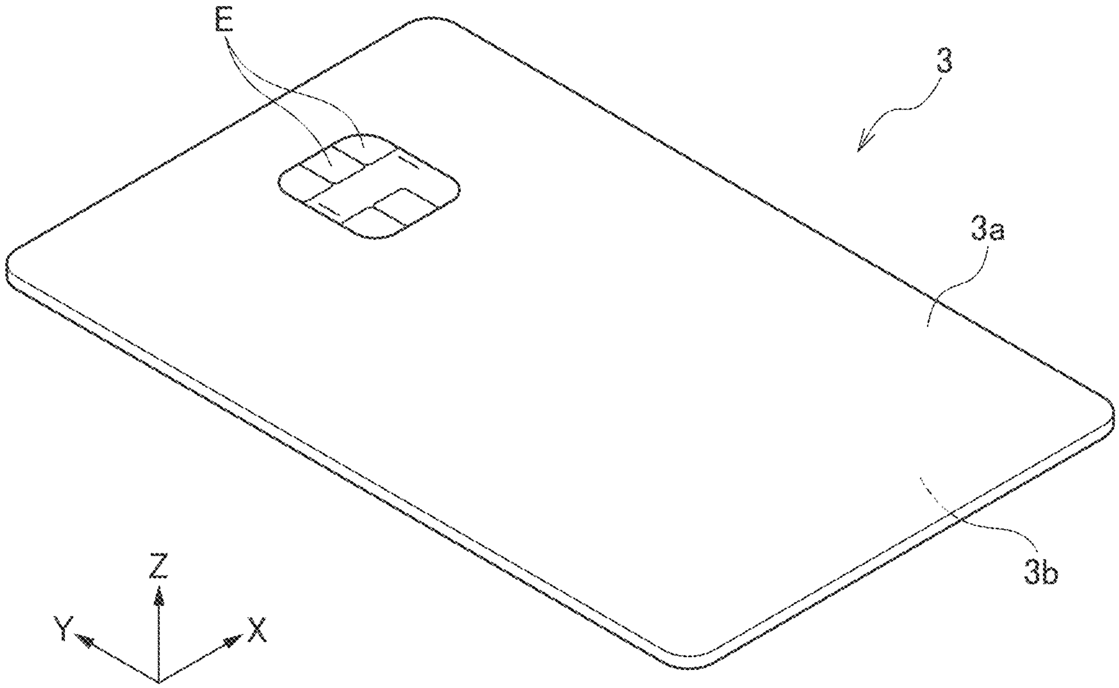
FIG. 1 is a schematic perspective view illustrating the outer appearance of an IC card 3 having an antenna device according to an embodiment of the present disclosure.

FIG. 1 is a schematic perspective view illustrating the outer appearance of an IC card 3 having an antenna device according to an embodiment of the present disclosure.

As illustrated in FIG. 1, the IC card 3 according to the present embodiment has a plate-like body in which the Y-, X-, and Z-directions thereof are respectively defined as the longer side direction, shorter side direction, and thickness direction and has an upper surface 3*a* and a back surface 3*b* which constitute the XY plane. The IC card 3 incorporates therein an IC module to be described later, and a terminal electrode E of the IC module is exposed to the upper surface 3*a* of the IC card 3.

Figure 2:
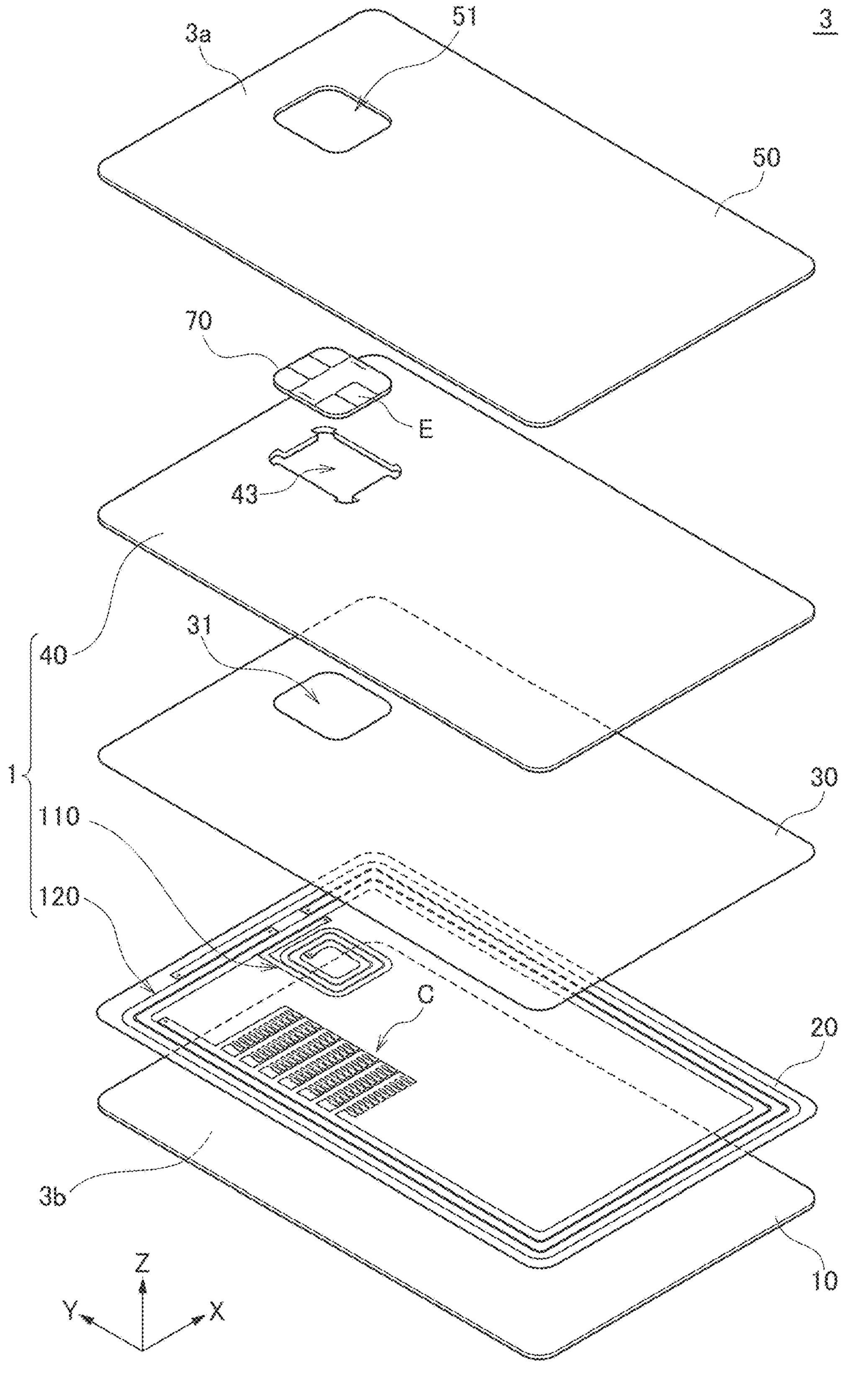
FIG. 2 is a schematic exploded perspective view for explaining the structure of the IC card 3 having an antenna device 1.
Figure 3:
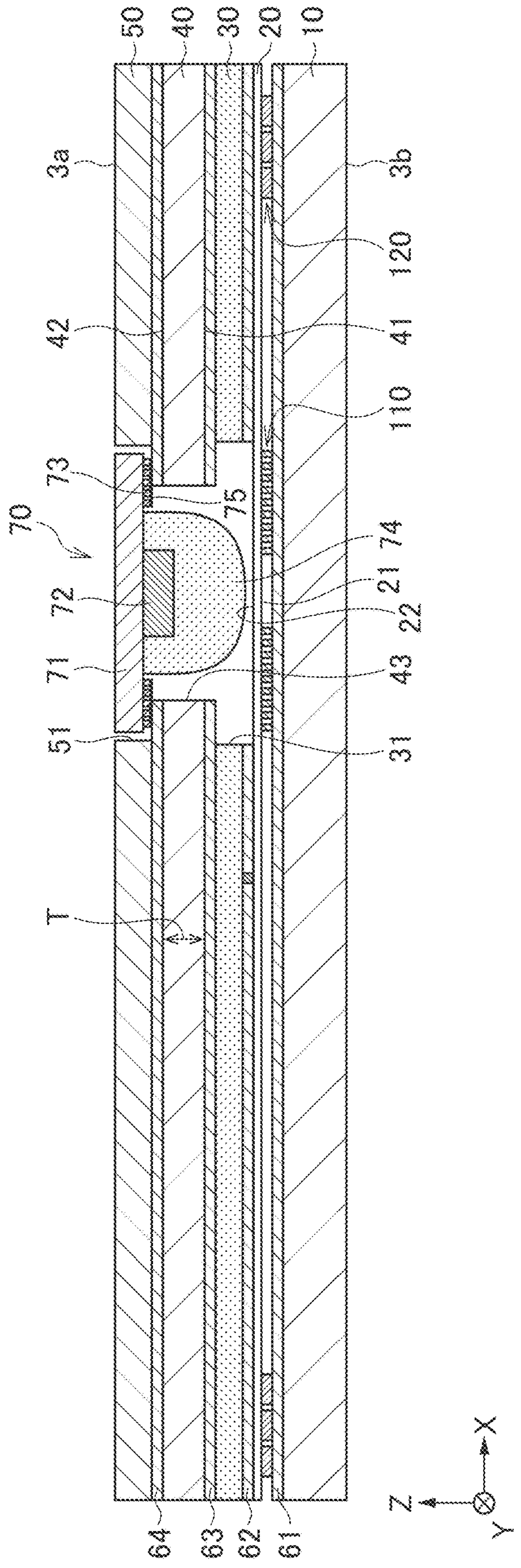
FIG. 3 is a schematic cross-sectional view for explaining the structure of the IC card 3 having an antenna device 1.

FIGS. 2 and 3 are respectively a schematic exploded perspective view and a schematic cross-sectional view for explaining the structure of the IC card 3 having an antenna device 1 according to the present embodiment.

The IC card 3 illustrated in FIGS. 2 and 3 has a structure in which a plastic plate 10, a coil including a film-like substrate 20 and first and second coil patterns 110 and 120 supported on the substrate 20, a magnetic body 30, a metal plate 40, and a protective sheet 50 are laminated in this order from the back surface 3*b* side to the upper surface 3*a* side. The antenna device 1 according to the present embodiment is composed of the first and second coil patterns 110 and 120 and metal plate 40. The plastic plate 10 and substrate 20 (including the first and second coil patterns 110 and 120 supported thereon) are bonded to each other through an adhesive layer 61. The substrate 20 and magnetic body 30 are bonded to each other through an adhesive layer 62. The magnetic body 30 and metal plate 40 are bonded to each other through an adhesive layer 63. The metal plate 40 and protective sheet 50 are bonded to each other through an adhesive layer 64. Examples of materials as adhesive layers 61 to 64 include an acrylic-based double-sided tape, a thermosetting resin, and a thermoplastic resin.

The plastic plate 10 is made of a resin material not blocking magnetic flux. The outer surface of the plastic plate 10 constitutes the back surface 3*b* of the IC card 3.

The substrate 20 is a film made of an insulating resin material and has a conductor pattern on each of one surface 21 and the other surface 22. The conductor pattern provided on the surface 21 of the substrate 20 includes the first and second coil patterns 110 and 120. Examples of a conductive material constituting the conductor pattern include copper, aluminum, and an alloy thereof. Examples of the insulating resin material constituting the substrate 20 include PET (Polyethylene Terephthalate) and PI (Polyimide). Although the surface 21 of the substrate 20 faces the plastic plate 10, and the surface 22 faces the magnetic body 30 and metal plate 40 in the example illustrated in FIG. 3, the front and back of the substrate 20 may be reversed.

The magnetic body 30 is made of a high permeability material. The magnetic body 30 may be a sheet-like member or a coated body coated onto the surface 22 of the substrate 20. When the magnetic body 30 is a sheet-like member, the magnetic body 30 and substrate 20 are bonded to each other through an adhesive layer 62 as illustrated in FIG. 3. When the magnetic body 30 is a coated body coated onto the surface 22 of the substrate 20, the magnetic body 30 and substrate 20 are directly bonded to each other without an adhesive layer interposed therebetween. The magnetic body 30 has a second through hole 31 formed therein.

The metal plate 40 is made of a metal material such as stainless steel or titanium. The plastic plate 10, substrate 20 and first and second coil patterns 110 and 120 formed thereon, and magnetic body 30 are arranged on one surface side of the metal plate 40, and the protective sheet 50 and an IC module 70 are arranged on the other surface 42 side of the metal plate 40. The metal plate 40 has a first through hole 43 at a position overlapping a second through hole 31 of the magnetic body 30. The first through hole 43 may be fully overlapped over the second through hole 31. Thus, the IC card 3 is a card that has a metal plate 40 in a part of the body.

The protective sheet 50 is made of resin or the like, and the outer surface thereof constitutes the upper surface 3*a* of the IC card 3. The protective sheet 50 has a third through hole 51 at a position overlapping a first through hole 43 formed in the metal plate 40. The first through hole 43 may entirely overlap the third through hole 51. The IC module 70 is disposed in the third through hole 51. A part of the IC module 70 overlaps the metal plate 40 and the remaining part thereof overlaps the first through hole 43 of the metal plate 40. Thus, the IC module 70 and first coil pattern 110 face each other through the first through hole 43. The surfaces 41 and 42 of the metal plate 40 may be flat. For example, a part of the surface 42 of the metal plate 40 that overlaps the IC module 70 and a part thereof that does not overlap the IC module 70 are flush with each other. In other words, there is provided no step or the like between a part of the surface 42 that overlaps the IC module 70 and a part thereof that does not overlap the IC module 70. This eliminates the need for complicated processing in the production of the metal plate 40.

Figure 4:
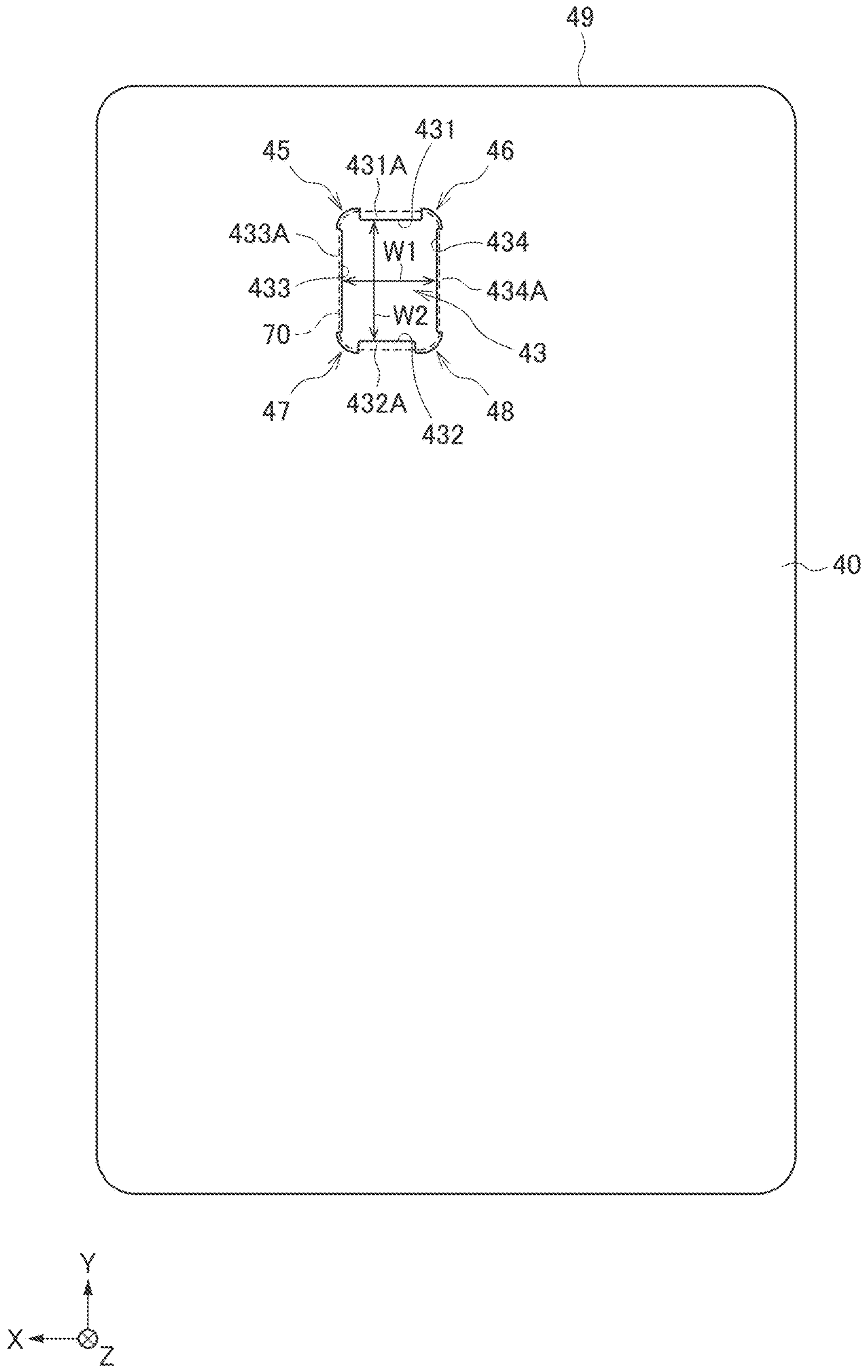
FIG. 4 is a schematic plan view for explaining the shape of the metal plate 40.

FIG. 4 is a schematic plan view for explaining the shape of the metal plate 40.

As illustrated in FIG. 4, the first through hole 43 formed in the metal plate 40 has first to fourth edges 431 to 434 positioned as follows with respect to the center of the first through hole 43: the first edge 431 is positioned on the side of the positive Y-direction (one side in the Y-direction); the second edge 432 is positioned on the side of the negative Y-direction (the other side in the Y-direction) opposite to the positive Y-direction side; the third edge 433 is positioned on the side of the positive X-direction (one side in the X-direction) crossing the positive Y-direction; and the fourth edge 434 is positioned on the side of the negative X-direction (the other side in the X-direction) opposite to the positive X-direction side.

The first edge 431 does not extend in a straight line in the X-direction but has a first protruding part 431A protruding in the negative Y-direction toward the center of the first through hole 43 and second edge 432. The edge of the leading end side of the first protruding part 431A extends in the X-direction. The second edge 432 does not extend in a straight line in the X-direction but has a second protruding part 432A protruding in the positive Y-direction toward the center of the first through hole 43 and first edge 431. The edge of the leading end side of the second protruding part 432A extends in the X-direction. The third edge 433 does not extend in a straight line in the Y-direction but has a third protruding part 433A protruding in the negative X-direction toward the center of the first through hole 43 and fourth edge 434. The edge of the leading end side of the third protruding part 433A extends in the Y-direction. The fourth edge 434 does not extend in a straight line in the Y-direction but has a fourth protruding part 434A protruding in the positive X-direction toward the center of the first through hole 43 and third edge 433. The edge of the leading end side of the fourth protruding part 434A extends in the Y-direction.

The first and third protruding parts 431A and 433A are not formed at a corner 45 between the first and third edges 431 and 433. The first and fourth protruding parts 431A and 434A are not formed at a corner 46 between the first and fourth edges 431 and 434. The second and third protruding parts 432A and 433A are not formed at a corner 47 between the second and third edges 432 and 433. The second and fourth protruding parts 432A and 434A are not formed at a corner 48 between the second and fourth edges 432 and 434.

Thus, a width W2 of the first through hole 43 in the Y-direction is reduced at a portion where the first and second protruding parts 431A and 432A are present, and a width W1 of the first through hole 43 in the X-direction is reduced at a portion where the third and fourth protruding parts 433A and 434A are present. In the example illustrated in FIG. 4, the width W2 which is the distance between the first and second protruding parts 431A and 432A in the Y-direction is larger than the width W1 which is the distance between the third and fourth protruding parts 433A and 434A in the X-direction. The planar shape of the first through hole 43 on the assumption that the first to fourth protruding parts 431A to 434A are absent is a substantially rectangular shape.

In FIG. 4, the position of the IC module 70 is denoted by a dashed line. The IC module 70 partially overlaps the first to fourth protruding parts 431A to 434A in a plan view (as viewed in the Z-direction). That is, in the present embodiment, the first through hole 43 is smaller in planar size than the IC module 70. Thus, the IC module 70 is prevented from being inserted into the first through hole 43 and supported on the surface 42 side of the metal plate 40 by the first to fourth protruding parts 431A to 434A. The four corners of the IC module 70 respectively overlaps the corners 45 to 48 of the first through hole 43.

In the example illustrated in FIG. 4, the width of each of the first and second protruding parts 431A and 432A in the X-direction exceeds half of the width of each of the first and second edges 431 and 432 in the X-direction. Similarly, in the example illustrated in FIG. 4, the width of each of the third and fourth protruding parts 433A and 434A in the Y-direction exceeds half of the width of each of the third and fourth edges 433 and 434 in the Y-direction. Thus, the IC module 70 can be stably supported on the surface 42 of the metal plate 40.

Further, in the example illustrated in FIG. 4, the protruding amount each of the first and second protruding parts 431A and 432A is larger than the protruding amount of each of the third and fourth protruding parts 433A and 434A. Thus, the IC module 70 elongated in the Y-direction can be supported more stably.

The first protruding part 431A is positioned at substantially the center of the first edge 431 in the X-direction, and the position of the tip thereof in the Y-direction does not overlap the third and fourth protruding parts 433A and 434A. The second protruding part 432A is positioned at substantially the center of the second edge 432 in the X-direction, and the position of the tip thereof in the Y-direction does not overlap the third and fourth protruding parts 433A and 434A. The third protruding part 433A is positioned at substantially the center of the third edge 433 in the Y-direction, and the position of the tip thereof in the X-direction does not overlap the first and second protruding parts 431A and 432A. The fourth protruding part 434A is positioned at substantially the center of the fourth edge 434 in the Y-direction, and the position of the tip thereof in the X-direction does not overlap the first and second protruding parts 431A and 432A.

Thus, when a virtual rectangular formed by connecting the tips of the first to fourth protruding parts 431A to 434A is assumed, the four corners thereof are respectively positioned at the corners 45 to 48 of the first through hole 43 at which the first to fourth protruding parts 431A to 434A are absent. In the example illustrated in FIG. 4, the first through hole 43 has a point symmetrical planar shape with respect to the center of the first through hole 43. This allows the IC module 70 to be stably supported by the first to fourth protruding parts 431A to 434A. Further, in the example illustrated in FIG. 4, the corner of the tip of each of the first to fourth protruding parts 431A to 434A is rounded. This can suppress the concentration of an electric field to the corner of the tip of each of the first to fourth protruding parts 431A to 434A and prevent the IC module 70 from being damaged by the sharp corners.

The first to fourth edges 431 to 434 respectively have the first to fourth protruding parts 431A to 434A in the example illustrated in FIG. 4, but not all the edges need to have the protruding part. For example, the third and fourth protruding parts 433A and 434A may be omitted (i.e., only the first and second protruding parts 431A and 432A are formed). In this case, the third and fourth edges 433 and 434 extend substantially in a straight line in the Y-direction.

Figure 5:
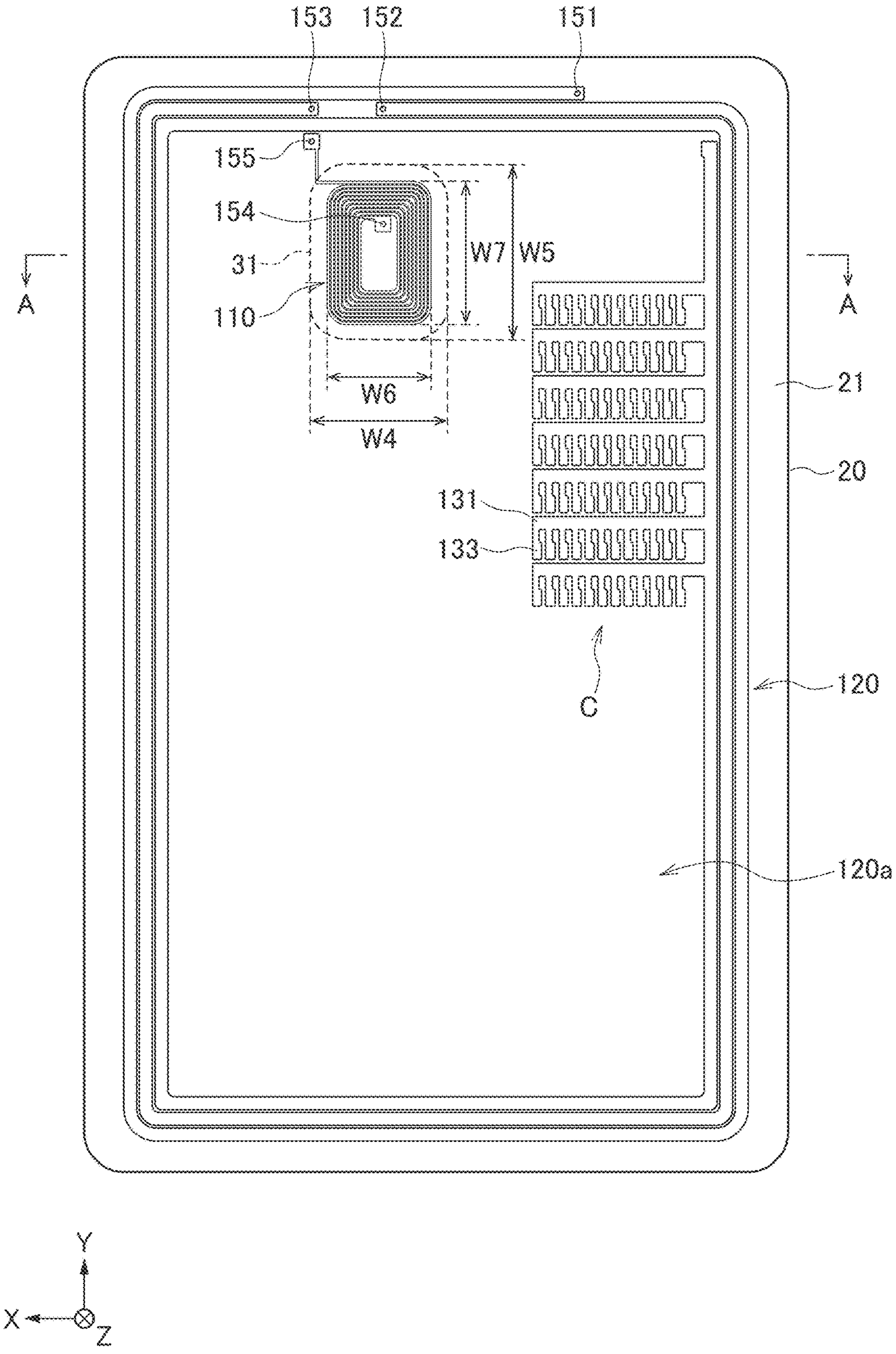
FIG. 5 is a schematic plan view of the conductor pattern formed on the surface 21 of the substrate 20.

FIG. 5 is a schematic plan view of the conductor pattern formed on the surface 21 of the substrate 20.

In the example illustrated in FIG. 5, the first coil pattern 110, second coil pattern 120, and capacitor patterns 131 and 133 are provided on the surface 21 of the substrate 20. In FIG. 5, the position of the second through hole 31 formed in the magnetic body 30 is denoted by a dashed line. The first coil pattern 110 is disposed at a position overlapping the second through hole 31 of the magnetic body 30. In the example illustrated in FIG. 5, the number of turns of the first coil pattern 110 is about nine. The width of the first coil pattern 110 in the X-direction is W6, and the width thereof in the Y-direction is W7. The width W6 is smaller than a width W4 of the second through hole 31 in the X-direction. The width W7 is smaller than a width W5 of the second through hole 31 in the Y-direction. In the example illustrated in FIG. 5, the entire first coil pattern 110 overlaps the second through hole 31 of the magnetic body 30.

The second coil pattern 120 is a pattern wound in about three turns along the outer edge of the substrate 20, and the first coil pattern 110 and capacitor patterns 131 and 133 are arranged inside an opening 120*a* surrounded by the second coil pattern 120. The substrate 20 and metal plate 40 have substantially the same outer shape and, thus, when they are put one over the other so as to overlap each other, the second coil pattern 120 is wound along an outer edge 49 of the metal plate 40 in a plan view.

The capacitor pattern 131 is a pattern branching from the innermost turn of the second coil pattern 120 in the X-direction. Although seven capacitor patterns 131 branch from the innermost turn of the second coil pattern 120 in the example illustrated in FIG. 5, the number of the capacitor patterns 131 is not particularly limited. Further, a plurality of capacitor patterns 133 branch from one capacitor pattern 131. The capacitor patterns 133 extend in the Y-direction. Although twelve capacitor patterns 133 branch from one capacitor pattern 131 in the example illustrated in FIG. 5, the number of the capacitor patterns 133 is not particularly limited.

Figure 6:
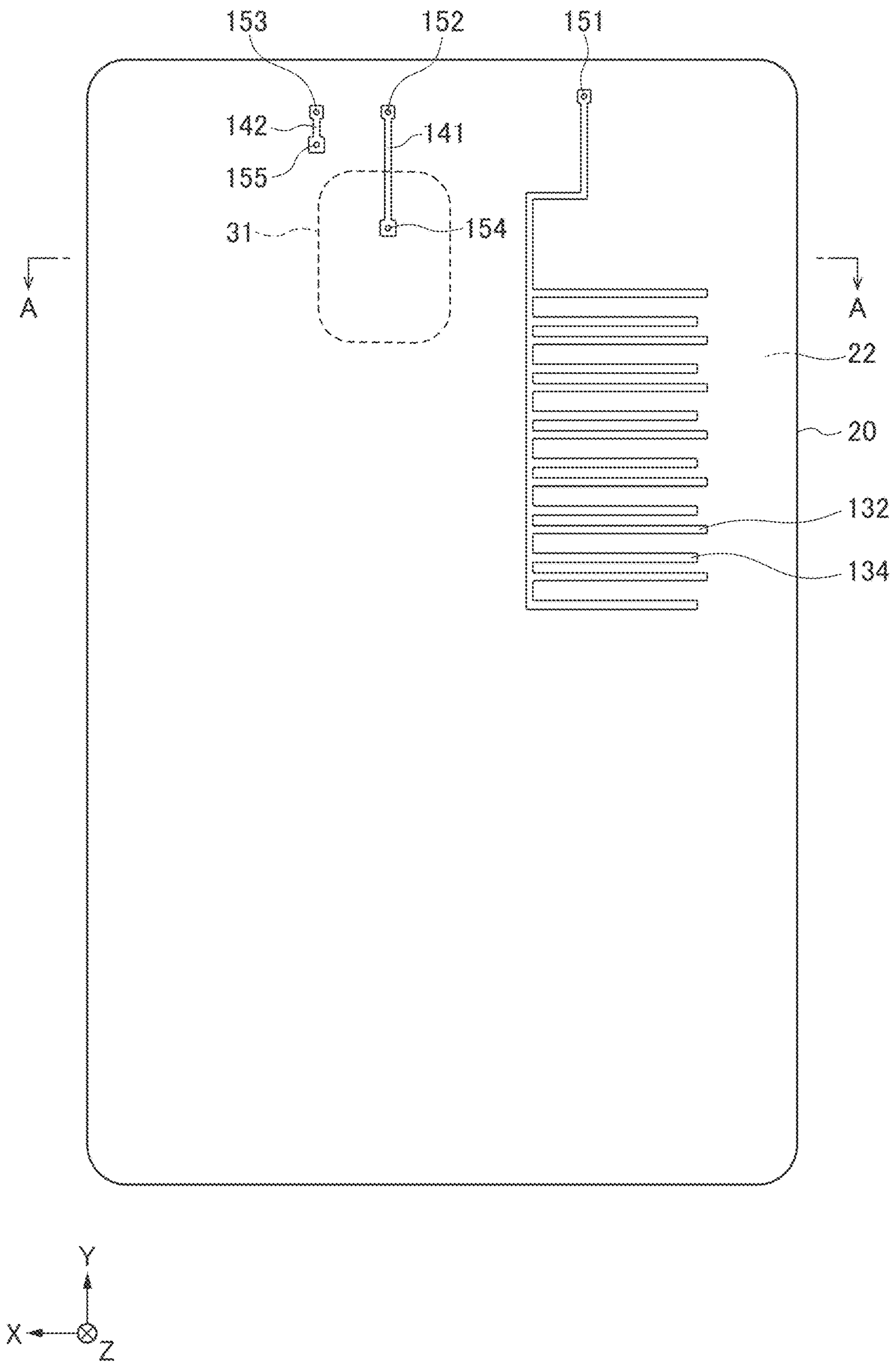
FIG. 6 is a schematic plan view of the conductor pattern formed on the surface 22 of the substrate 20.

FIG. 6 is a schematic plan view of the conductor pattern formed on the surface 22 of the substrate 20 as transparently viewed through the substrate 20 from the surface 21 side.

As illustrated in FIG. 6, capacitor patterns 132, 134 and connection patterns 141, 142 are arranged on the surface 22 of the substrate 20. The planar positions of the capacitor patterns 132 and 134 coincide respectively with the capacitor patterns 131 and 133. That is, the capacitor patterns 131 and 132 face each other through the substrate 20, and the capacitor patterns 133 and 134 face each other through the substrate 20. Thus, a capacitor C is constituted by the capacitor patterns 131 and 133 provided on the surface 21 of the substrate 20, the capacitor patterns 132 and 134 provided on the surface 22 of the substrate 20, and the substrate 20 interposed therebetween. The capacitance of the capacitor C having such a pattern shape can be finely adjusted by removal of some capacitor patterns 133 through trimming.

As illustrated in FIGS. 5 and 6, the outer peripheral end of the second coil pattern 120 is connected to the capacitor patterns 132 and 134 through a via conductor 151 penetrating the substrate 20. Further, out of the turns constituting the second coil pattern 120, the second turn counted from the outermost turn (second turn counted from the innermost turn) is partially divided. The one and the other end portions divided are connected respectively to via conductors 152 and 153 penetrating the substrate 20. The via conductor 152 is connected to one end of the connection pattern 141, and the via conductor 153 is connected to one end of the connection pattern 142. The other ends of the connection patterns 141 and 142 are connected respectively to via conductors 154 and 155 penetrating the substrate 20. The via conductors 154 and 155 are connected respectively to the inner and outer peripheral ends of the first coil pattern 110.

Figure 7:
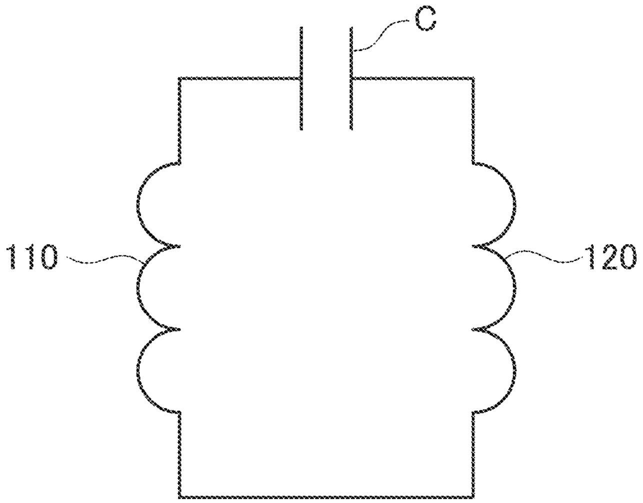
FIG. 7 is an equivalent circuit diagram of the antenna device 1.
Figure 8:
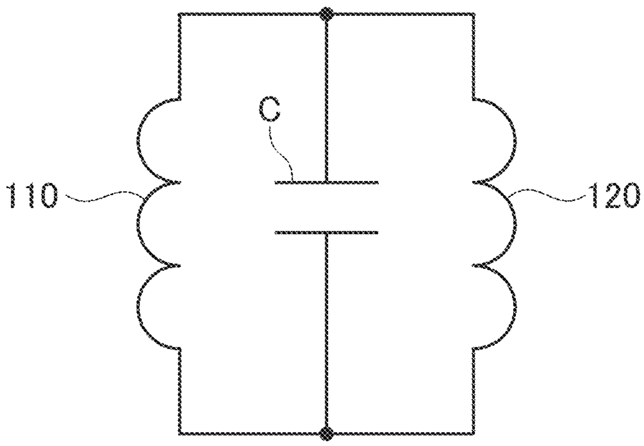
FIG. 8 is an equivalent circuit diagram of the antenna device according to a modification.

With the above configuration, the first and second coil patterns 110 and 120 are connected in series to each other, and the capacitor C is connected in series to the first and second coil patterns 110 and 120 as illustrated in FIG. 7. A resonance circuit composed of the first and second coil patterns 110 and 120 and the capacitor C constitutes a closed circuit connected to no external circuit. The capacitor C acts to improve communication characteristics by adjusting a resonance frequency. By setting the resonance frequency of the closed circuit to 13.56 MHz or a frequency band in the vicinity of 13.56 MHZ, near field communication (NFC) can be performed. Alternatively, as illustrated in FIG. 8, the capacitor C may be connected in parallel to the first and second coil patterns 110 and 120. In this case, by making the line length of the first coil pattern 110 longer than the line length of the second coil pattern 120, it is possible to obtain the same resonance characteristics as those obtained when the capacitor C is connected in series to the first and second coil patterns 110 and 120.

Figure 9:
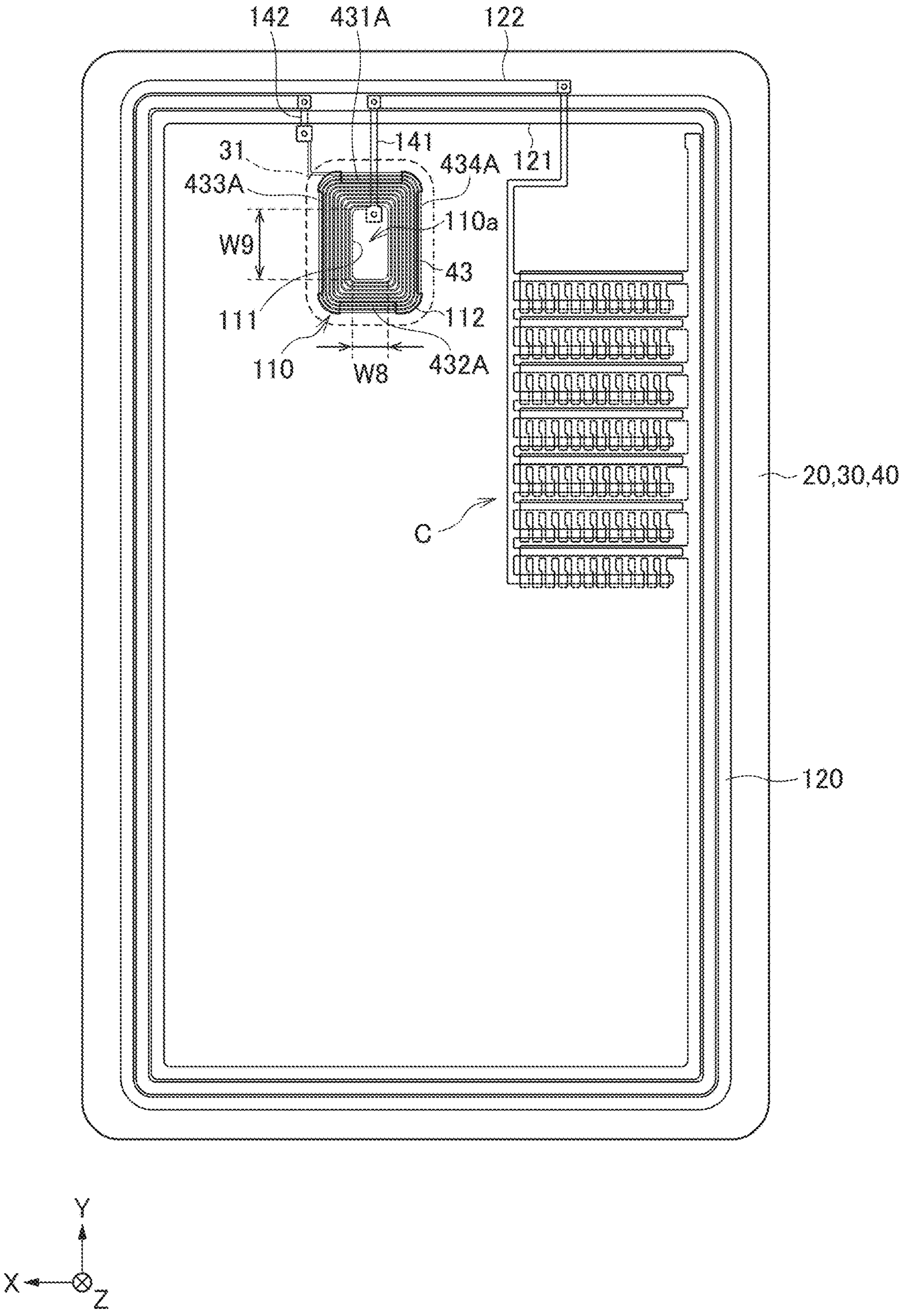
FIG. 9 is a schematic plan view illustrating a state where the substrate 20, magnetic body 30, and metal plate 40 are put one over another so as to overlap one another.

FIG. 9 is a schematic plan view illustrating a state where the substrate 20, magnetic body 30, and metal plate 40 are put one over another so as to overlap one another.

As illustrated in FIG. 9, when the substrate 20, magnetic body 30, and metal plate 40 are put one over another so as to overlap one another, the first coil pattern 110 provided on the substrate 20, the second through hole 31 of the magnetic body 30, and the first through hole 43 of the metal plate 40 overlap one another in the Z-direction. An opening 110*a* surrounded by the first coil pattern 110 also overlaps the second through hole 31 and first through hole 43. The width of the opening 110*a* in the X-direction is W8, and the width thereof in the Y-direction is W9. The width W8 is smaller than the widths W1 and W4 (see FIGS. 4 and 5), and the width W9 is smaller than the widths W2 and W5 (see FIGS. 4 and 5). That is, the area of the opening 110*a* is smaller than the areas of the through holes 31 and 43. The opening 110*a* of the first coil pattern 110 may entirely overlap the through holes 31 and 43. This can prevent interference between the magnetic flux passing through the opening 110*a* of the first coil pattern 110 and the magnetic body 30 and between the magnetic flux and the metal plate 40.

The width W6 (see FIG. 5) of the first coil pattern 110 in the X-direction is larger than the width W1 (see FIG. 4) of the first through hole 43 of the metal plate 40 in the X-direction. The width W7 (see FIG. 5) of the first coil pattern 110 in the Y-direction is larger than the width W2 (see FIG. 4) of the first through hole 43 of the metal plate 40 in the Y-direction. Thus, when the substrate 20 and metal plate 40 are put one over the other so as to overlap each other, the tips of the first to fourth protruding parts 431A to 434A of the first through hole 43 overlap the winding area of the first coil pattern 110. The winding area of the first coil pattern 110 refers to the area between inner and outer peripheral edges 111 and 112 of the first coil pattern 110. As a result, the first coil pattern 110 includes a portion that overlaps the metal plate 40 and a part that overlaps the first through hole 43 without overlapping the metal plate 40. The outer peripheral edge 112 of the first coil pattern 110 has a portion positioned between the edge of the second through hole 31 of the magnetic body 30 and the edge of the first through hole 43 of the metal plate 40. The winding area of the second coil pattern 120 refers to the area between inner and outer peripheral edges 121 and 122 of the second coil pattern 120.

In the example illustrated in FIG. 9, the tips of the first to fourth protruding parts 431A to 434A are positioned outside the radial center of the winding area of the first coil pattern 110. This reduces the overlap area between the winding area of the first coil pattern 110 and the metal plate 40, so that more magnetic flux can be made to pass through the first through hole 43. Further, a magnetic flux density is lower at portions immediately above and below the winding area of the first coil pattern 110 than at the opening 110*a* and in the vicinity of the outer peripheral edge 112, so that when the edges 431 to 434 of the first through hole 43 are positioned in this area, it is possible to prevent deterioration in antenna characteristics due to a demagnetizing field.

In the example illustrated in FIG. 9, the protruding amounts of the first and second protruding parts 431A and 432A are larger than those of the third and fourth protruding parts 433A and 434A. This reveals that the tips of the first and second protruding parts 431A and 432A are positioned closer to the radial center of the winding area of the first coil pattern 110 than the tips of the third and fourth protruding parts 433A and 434A.

Figure 10:
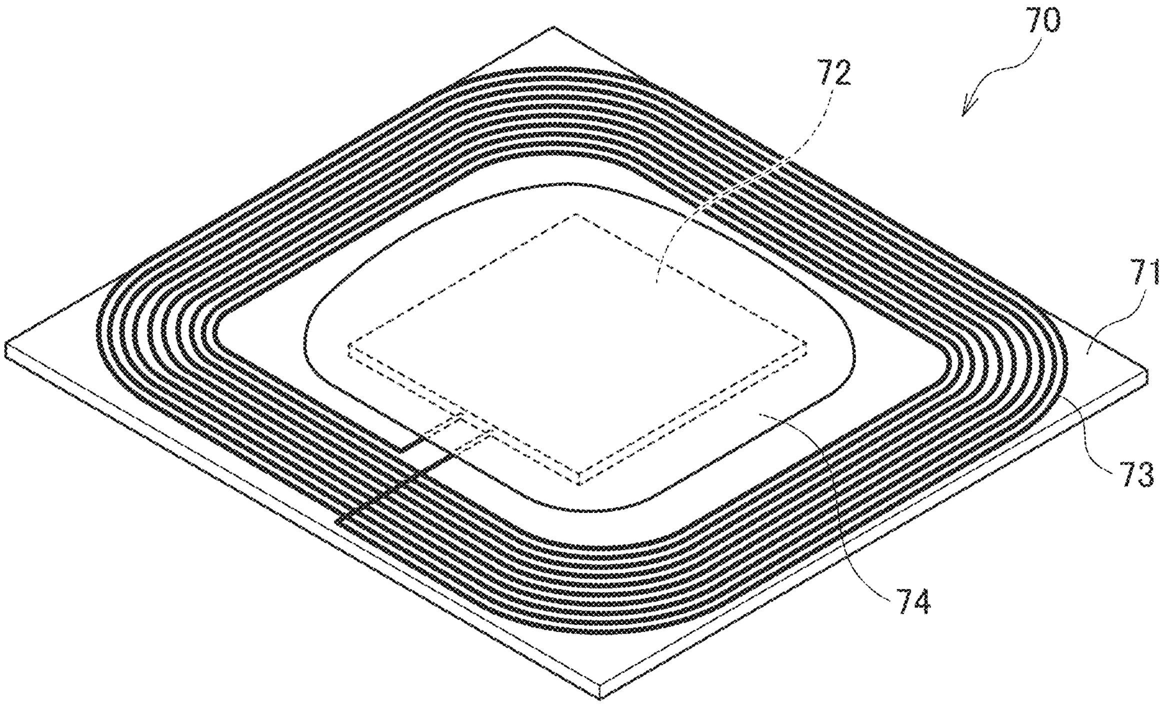
FIG. 10 is a schematic perspective view of the IC module 70 as viewed from the back surface side.

FIG. 10 is a schematic perspective view of the IC module 70 as viewed from the back surface 3*b* side.

As illustrated in FIG. 10, the IC module 70 includes a module substrate 71, an IC chip 72 mounted on or incorporated in the module substrate 71, and a coupling coil 73. The IC chip 72 is protected by being covered with a dome-shaped protective resin 74. The protective resin 74 is made of an insulating member. When the IC module 70 is disposed on the surface 42 of the metal plate 40, the coupling coil 73 and adhesive layer 64 are bonded to each other through a hot melt tape 75, as illustrated in FIG. 3. In this state, the protective resin 74 may partially be disposed in the first through hole 43 of the metal plate 40. The terminal electrode E illustrated in FIG. 1 is provided on the back surface side (upper surface 3*a* side of the IC card 3) of the module substrate 71. The IC module 70 thus configured is disposed on the surface 42 side of the metal plate 40. Although the protective resin 74 may partially be disposed in the first through hole 43 of the metal plate 40 as described above, the module substrate 71 itself is not disposed therein. This can make the first through hole 43 of the metal plate 40 smaller in size than the module substrate 71.

Figure 11:
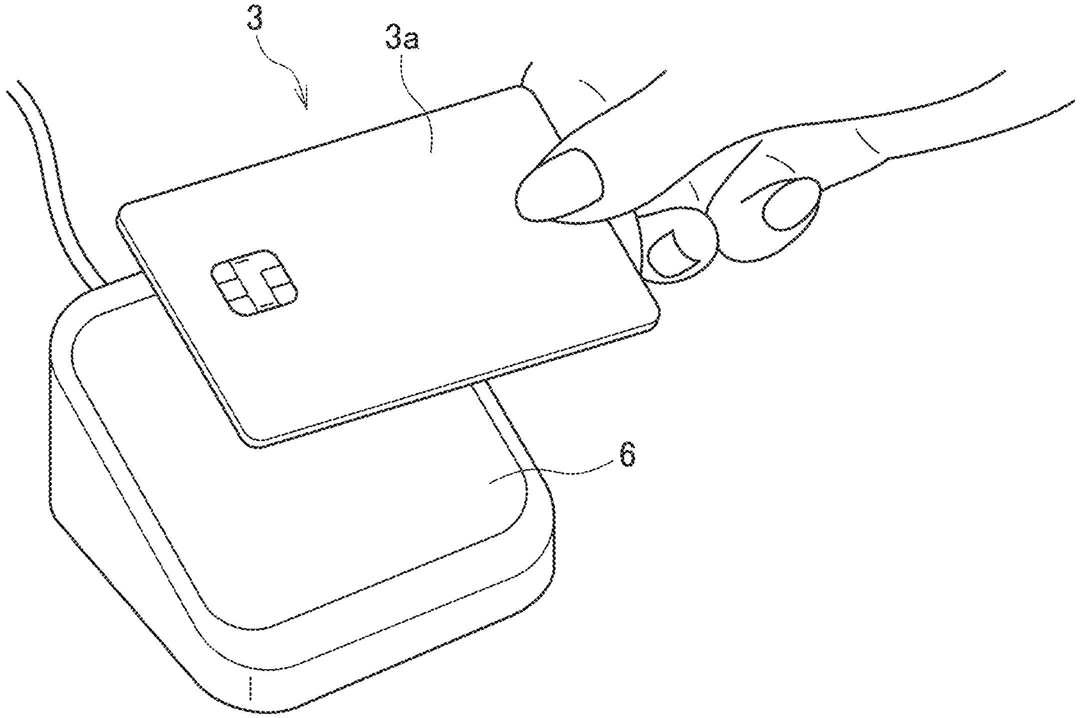
FIG. 11 is a schematic diagram showing a state in which the IC card 3 and the card reader 6 communicate with each other.

In a state where the IC module 70 is disposed on the surface 42 side of the metal plate 40, the coupling coil 73 and the first coil pattern 110 provided on the substrate 20 are electromagnetically coupled to each other through the first through hole 43 of the metal plate 40. The planar position of the winding area of the coupling coil 73 may substantially coincide with the planar position of the winding area of the first coil pattern 110. In this case, the tips of the first to fourth protruding parts 431A to 434A of the first through hole 43 of the metal plate 40 overlap the winding area of the coupling coil 73. Since the first coil pattern 110 is connected in series to the second coil pattern 120, a current flowing in the first coil pattern 110 flows in the second coil pattern 120, with the result that a magnetic field is generated from the second coil pattern 120. Thus, as shown in FIG. 11, when the back surface 3*b* of the IC card 3 is made to face a card reader 6, communication can be performed between the card reader 6 and the IC chip 72.

In the present embodiment, the number of turns of the first coil pattern 110 is about nine, and the number of turns of the second coil pattern 120 is about three. That is, the first coil pattern 110 is larger in the number of turns than the second coil pattern 120. This enhances coupling between the first coil pattern 110 and the coupling coil 73 of the IC module 70. On the other hand, the second coil pattern 120 is smaller in the number of turns than the first coil pattern 110 and larger in the pattern width than the first coil pattern 110, so that the resistance value of the second coil pattern 120 is reduced.

As described above, in the antenna device 1 according to the present embodiment, the metal plate 40 has the first through hole 43, and the first coil pattern 110 is wound along the first through hole 43 with the opening 110*a* thereof overlapping the first through hole 43, so that the IC module 70 disposed on the surface 42 of the metal plate 40 and the first coil pattern 110 disposed on the surface 41 side of the metal plate 40 can be coupled to each other. In addition, the first to fourth edges 431 to 434 of the first through hole 43 respectively have the first to fourth protruding parts 431A to 434A, so that the IC module 70 larger in planar size than the first through hole 43 can be supported on the surface 42 of the metal plate 40 by the first to fourth protruding parts 431A to 434A. Further, the first through hole 43 is smaller in planar size than the IC module 70, increasing the strength of the metal plate 40. Further, the four corners of the IC module 70 respectively overlap the corners 45 to 48 of the first through hole 43, and the metal plate 40 does not support the entire peripheral edge of the IC module 70, so that the area of the metal plate 40 that covers the coupling area between the coupling coil 73 of the IC module 70 and the first coil pattern 110 of the antenna device 1 is reduced, which in turn can prevent deterioration in coupling between the coupling coil 73 of the IC module 70 and the first coil pattern 110 of the antenna device 1. Thus, since the first to fourth edges 431 to 434 of the first through hole 43 respectively have the first to fourth protruding parts 431A to 434A, it is possible to prevent deterioration in communication characteristics due to the presence of the metal plate 40.

Figure 12:
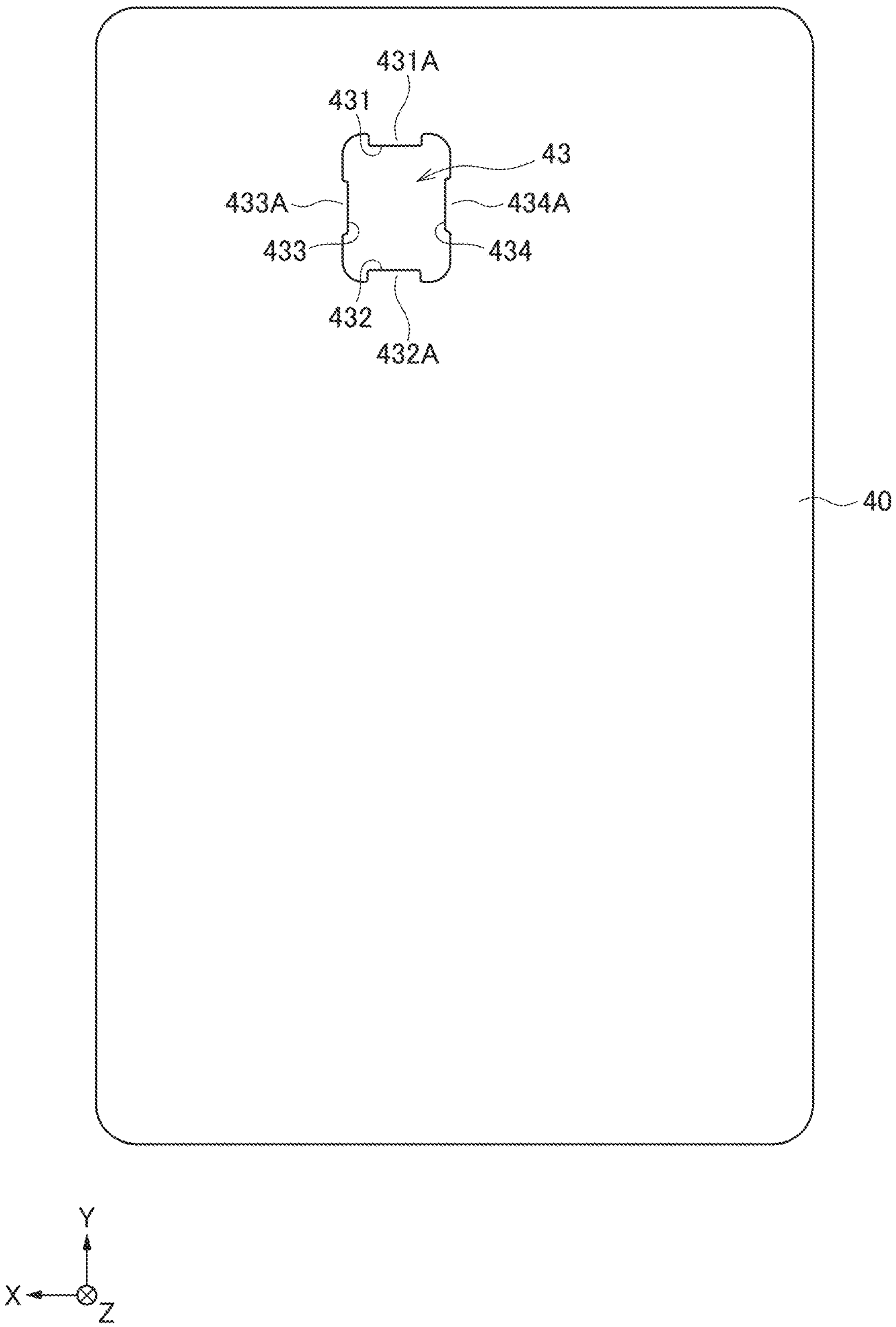
FIG. 12 is a schematic plan view for explaining the shape of the metal plate 40 according to a first modification.

FIG. 12 is a schematic plan view for explaining the shape of the metal plate 40 according to a first modification.

The metal plate 40 illustrated in FIG. 12 differs from the metal plate 40 illustrated in FIG. 4 in that the width in the X-direction of each of the first and second protruding parts 431A and 432A is about ½ of the width in the X-direction of each of the first and second edges 431 and 432 and that the width in the Y-direction of each of the third and fourth protruding parts 433A and 434A is about ½ of the width in the Y-direction of each of the third and fourth edges 433 and 434. By thus reducing the widths of the first to fourth protruding parts 431A to 434A, the area of the first through hole 43 is enlarged, so that more magnetic flux can be made to pass through the first through hole 43.

Figure 13:
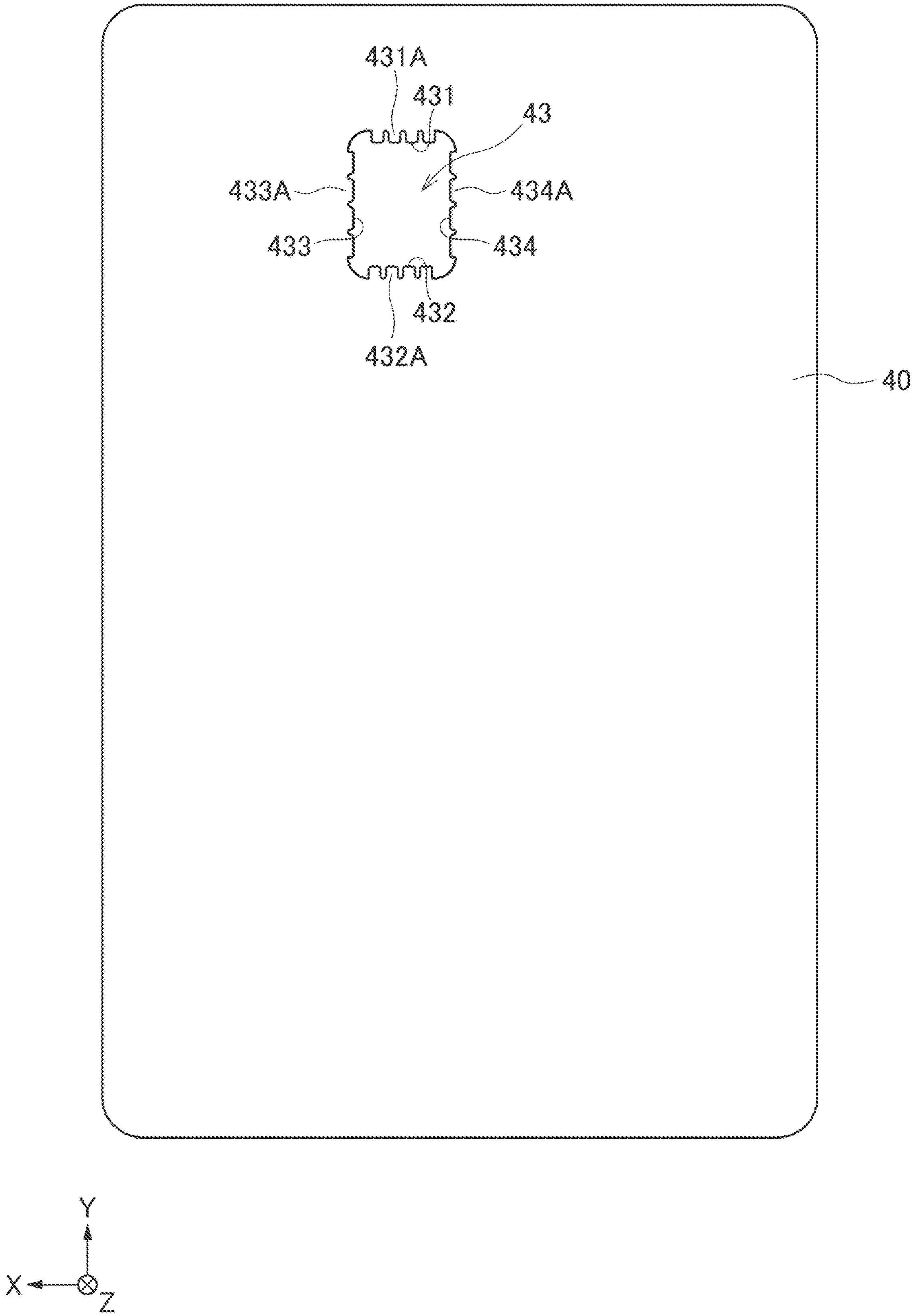
FIG. 13 is a schematic plan view for explaining the shape of the metal plate 40 according to a second modification.

FIG. 13 is a schematic plan view for explaining the shape of the metal plate 40 according to a second modification.

The metal plate 40 illustrated in FIG. 13 differs from the metal plate 40 illustrated in FIG. 4 in that each of the first to fourth protruding parts 431A to 434A is divided into a plurality of parts. Thus, the first to fourth edges 431 to 434 may each have a plurality of protruding parts. This makes it possible to make more magnetic flux pass through the first through hole 43 while stably supporting the IC module 70.

Figure 14:
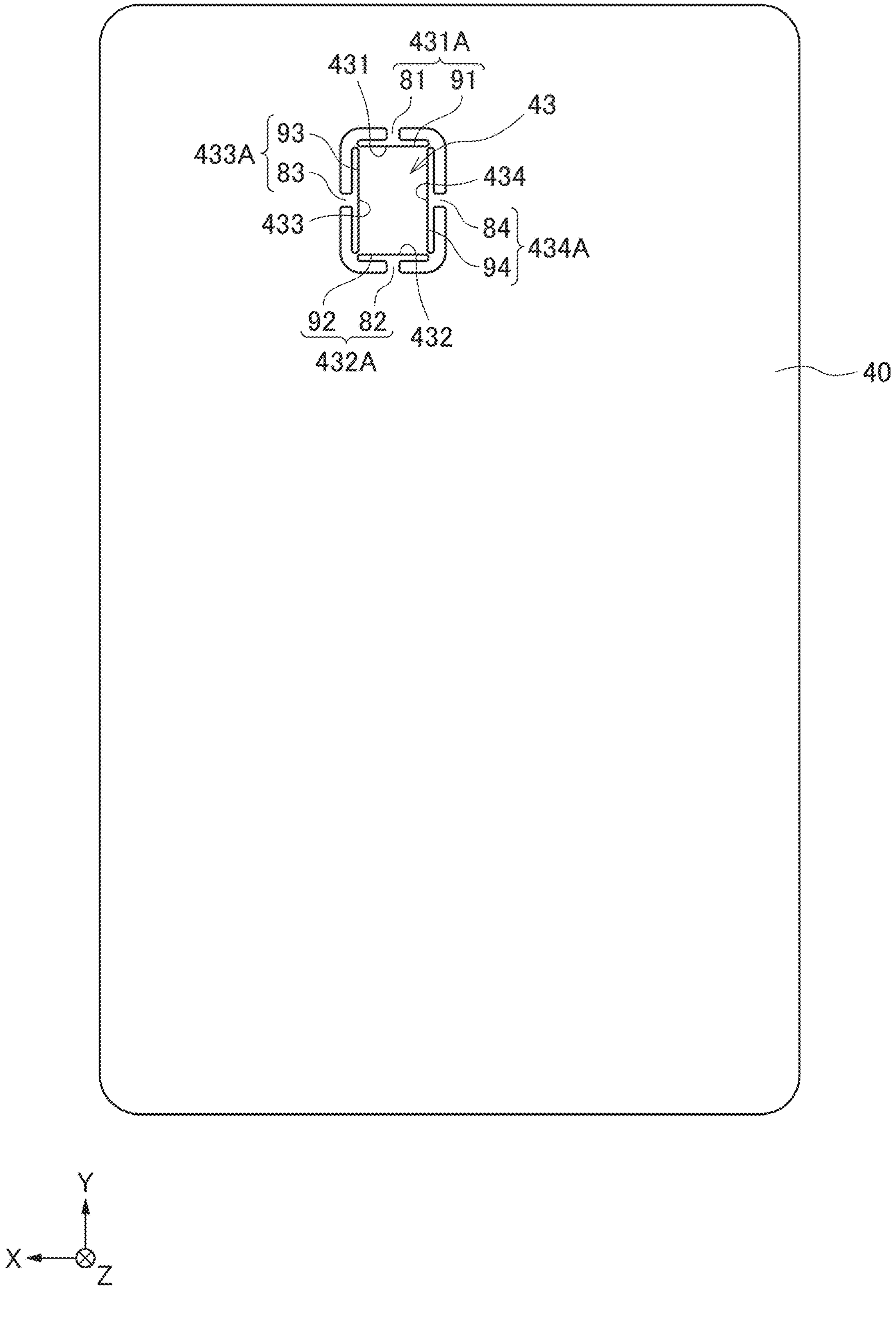
FIG. 14 is a schematic plan view for explaining the shape of the metal plate 40 according to a third modification.

FIG. 14 is a schematic plan view for explaining the shape of the metal plate 40 according to a third modification.

The metal plate 40 illustrated in FIG. 14 differs from the metal plate 40 illustrated in FIG. 4 in the following points: the first protruding part 431A has a first connection part 81 and a first wide part 91; the second protruding part 432A has a second connection part 82 and a second wide part 92; the third protruding part 433A has a third connection part 83 and a third wide part 93; and the fourth protruding part 434A has a fourth connection part 84 and a fourth wide part 94. Tye first to fourth connection parts 81 to 84 are portions connected to the main body part of the metal plate 40. The first to fourth wide parts 91 to 94 are portions closer to the center of the first through hole 43 than the respective first to fourth connection parts 81 to 84. That is, the first wide part 91 is positioned on the negative Y-direction side relative to the first connection part 81, the second wide part 92 is positioned on the positive Y-direction side relative to the second connection part 82, the third wide part 93 is positioned on the negative X-direction side relative to the third connection part 83, and the fourth wide part 94 is positioned on the positive X-direction side relative to the fourth connection part 84. In the example illustrated in FIG. 14, the first to fourth wide parts 91 to 94 respectively constitute the tips of the first to fourth edges 431 to 434. The width in the X-direction of each of the first and second wide parts 91 and 92 is larger than the width in the X-direction of each of the first and second connection parts 81 and 82. Similarly, the width in the Y-direction of each of the third and fourth wide parts 93 and 94 is larger than the width in the Y-direction of each of the third and fourth connection parts 83 and 84.

When the metal plate 40 having such a shape is used, the outer peripheral edge of the first coil pattern 110 or coupling coil 73 can be made to overlap, in a plan view, a space between the first to fourth wide parts 91 to 94 and the main body part of the metal plate 40. Thus, a large part of the outer peripheral edge of the first coil pattern 110 or coupling coil 73 overlaps the first through hole 43 without overlapping the metal plate 40, so that more magnetic flux can be made to pass through the first through hole 43.

While the preferred embodiment of the present disclosure has been described, the present disclosure is not limited to the above embodiment, and various modifications may be made within the scope of the present disclosure, and all such modifications are included in the present disclosure.

For example, the conductor patterns may be provided on the surface 21 and 22 of the substrate 20 not directly but through a material layer containing resin. Further, the coil may be constituted by a wound conductive wire.

Further, the pattern shapes of the first and second coil patterns 110 and 120 constituting the coil are not limited to those illustrated in FIG. 5. For example, the first coil pattern 110 may be formed by making the turns of the second coil pattern 120 protrude toward the opening 120*a* and then by winding the protrusions in the reverse direction to the winding direction of the second coil pattern 120. In this case, the first and second coil patterns 110 and 120 can be formed only one surface of the substrate 20.

The technology according to the present disclosure includes the following configuration examples but not limited thereto.

An antenna device according to an embodiment of the present disclosure includes: a metal plate having a first through hole; and a coil including first and second coils, the first coil being wound along the first through hole and having an opening that overlaps the first through hole, the second coil being wound along the outer edge of the metal plate and connected to the first coil. The edge of the first through hole includes a first edge positioned on one side in a first direction as viewed from the center of the first through hole and a second edge positioned on the other side in the first direction as viewed from the center of the first through hole. The first edge has a first protruding part protruding toward the second edge and overlapping the winding area of the first coil, and the second edge has a second protruding part protruding toward the first edge and overlapping the winding area of the first coil. This makes it possible to support an IC module or the like on the surface of the metal plate and to prevent deterioration in communication characteristics due to the presence of the metal plate.

In the above antenna device, the first through hole may have a point symmetrical planar shape with respect to the center of the first through hole. This makes it possible to stably support an IC module or the like on the surface of the metal plate.

In the above antenna device, the tips of the first and second protruding parts may be positioned outside the radial center of the winding area of the first coil. This can reduce the overlap area between the first coil and the metal plate.

In the above antenna device, the first edge may have a plurality of the first protruding parts, and the second edge may have a plurality of the second protruding parts. This can make more magnetic flux to pass through the first through hole while stably supporting an IC module or the like on the surface of the metal plate.

In the above antenna device, the corner of the tip of each of the first and second protruding parts may be rounded. This can suppress the concentration of an electric field to the corner of the tip of each of the first and second protruding parts.

In the above antenna device, the edge of the first through hole may further include a third edge positioned on one side in a second direction crossing the first direction as viewed from the center of the first through hole and a fourth edge positioned on the other side in the second direction as viewed from the center of the first through hole. The third edge may have a third protruding part protruding toward the fourth edge and overlapping the winding area of the first coil, and the fourth edge may have a fourth protruding part protruding toward the third edge and overlapping the winding area of the first coil. This makes it possible to support more stably an IC module or the like on the surface of the metal plate.

In the above antenna device, the first edge may have a plurality of the first protruding parts, the second edge may have a plurality of the second protruding parts, the third edge may have a plurality of the third protruding parts, and the fourth edge may have a plurality of the fourth protruding parts. This makes it possible to make more magnetic flux pass through the first through hole while stably supporting the IC module or the like on the surface of the metal plate.

In the above antenna device, the first protruding part may have a first connection part and a first wide part positioned on the other side in the first direction relative to the first connection part, and the second protruding part may have a second connection part and a second wide part positioned on the one side in the first direction relative to the second connection part. The width of each of the first and second wide parts in the second direction crossing the first direction may be larger than the width of the first and second connection parts in the second direction. This can reduce overlap between the outer edge portion of the first coil and the metal plate.

In the above antenna device, the second coil may be larger in pattern width and smaller in the number of turns than the first coil. This can increase the density of magnetic flux generated by the first coil and reduce the resistance value of the second coil.

The above antenna device may further include a magnetic body having a second through hole overlapping the first through hole. The second through hole may be larger in area than the first through hole so as to allow the entire first through hole to overlap the second through hole. This can eliminate overlap between the first coil and the magnetic body.

An IC card according to an embodiment of the present disclosure includes any of the above antenna devices and an IC module that overlaps the first coil through the first through hole. Thus, there can be provided an IC card including the metal plate.

In the above IC card, the IC module may have a coupling coil that overlaps the first coil in a plan view, and the first and second protruding parts may overlap the winding area of the coupling coil. This allows the edge of the first through hole of the metal plate to be disposed in an area with a low magnetic flux density.

In the above IC card, the first coil may be disposed on one surface side of the metal plate, the IC module may be disposed on the other surface side, the IC module may have a module substrate, an IC chip mounted on the module substrate, and a protective resin covering the IC chip, and the protective resin is at least partially positioned in the first through hole. This allows the IC module and first coil to be coupled to each other without disposing the module substrate in the first through hole of the metal plate.

What is claimed is:

1. An antenna device comprising:

a metal plate having a first through hole; and a coil including first and second coils, the first coil being wound along the first through hole and having an opening that overlaps the first through hole, the second coil being wound along an outer edge of the metal plate and connected to the first coil, wherein an edge of the first through hole includes a first edge positioned on one side in a first direction as viewed from a center of the first through hole and a second edge positioned on another side in the first direction as viewed from the center of the first through hole, wherein the first edge has a first protruding part protruding toward the second edge and overlapping a winding area of the first coil, wherein the second edge has a second protruding part protruding toward the first edge and overlapping the winding area of the first coil, wherein the first edge and the second edge are on opposite sides of the first through hole.

2. The antenna device as claimed in claim 1, wherein the first through hole has a point symmetrical planar shape with respect to the center of the first through hole.

3. The antenna device as claimed in claim 1, wherein tips of the first and second protruding parts are positioned outside a radial center of the winding area of the first coil.

4. The antenna device as claimed in claim 1, wherein the first edge has a plurality of the first protruding parts, and wherein the second edge has a plurality of the second protruding parts.

5. The antenna device as claimed in claim 1, wherein a corner of a tip of each of the first and second protruding parts is rounded.

6. The antenna device as claimed in claim 1, wherein the edge of the first through hole further includes a third edge positioned on one side in a second direction crossing the first direction as viewed from the center of the first through hole and a fourth edge positioned on another side in the second direction as viewed from the center of the first through hole, wherein the third edge has a third protruding part protruding toward the fourth edge and overlapping the winding area of the first coil, and wherein the fourth edge has a fourth protruding part protruding toward the third edge and overlapping the winding area of the first coil.

7. The antenna device as claimed in claim 6, wherein the first edge has a plurality of the first protruding parts, wherein the second edge has a plurality of the second protruding parts, wherein the third edge has a plurality of the third protruding parts, and wherein the fourth edge has a plurality of the fourth protruding parts.

8. The antenna device as claimed in claim 1, wherein the first protruding part has a first connection part and a first wide part positioned on the another side in the first direction relative to the first connection part, wherein the second protruding part has a second connection part and a second wide part positioned on the one side in the first direction relative to the second connection part, and wherein a width of each of the first and second wide parts in a second direction crossing the first direction is larger than a width of the first and second connection parts in the second direction.

9. The antenna device as claimed in claim 1, wherein the second coil is larger in pattern width and smaller in a number of turns than the first coil.

10. The antenna device as claimed in claim 1, further comprising a magnetic body having a second through hole overlapping the first through hole, wherein the second through hole is larger in area than the first through hole so as to allow an entire first through hole to overlap the second through hole.

11. The antenna device as claimed in claim 1, wherein the first and second edges are parallel with each other.

12. The antenna device as claimed in claim 1, wherein the first protruding part is shaped as a rectangle.

13. The antenna device as claimed in claim 1, wherein the first protruding part is shaped as a rectangle and the second protruding part is shaped as a rectangle.

14. An IC card comprising:

an antenna device comprising:

a metal plate having a first through hole; and a coil including first and second coils, the first coil being wound along the first through hole and having an opening that overlaps the first through hole, the second coil being wound along an outer edge of the metal plate and connected to the first coil; and an IC module that overlaps the first coil through the first through hole, wherein an edge of the first through hole includes a first edge positioned on one side in a first direction as viewed from a center of the first through hole and a second edge positioned on another side in the first direction as viewed from the center of the first through hole, wherein the first edge has a first protruding part protruding toward the second edge and overlapping a winding area of the first coil, wherein the second edge has a second protruding part protruding toward the first edge and overlapping the winding area of the first coil, wherein the first edge and the second edge are on opposite sides of the first through hole.

15. The IC card as claimed in claim 14, wherein the IC module has a coupling coil that overlaps the first coil in a plan view, and wherein the first and second protruding parts overlap a winding area of the coupling coil.

16. The IC card as claimed in claim 14, wherein the first coil is disposed on one surface side of the metal plate, wherein the IC module is disposed on another surface side of the metal plate, wherein the IC module has a module substrate, an IC chip mounted on the module substrate, and a protective resin covering the IC chip, and wherein the protective resin is at least partially positioned in the first through hole.

17. The IC card as claimed in claim 14, wherein the first and second edges are parallel with each other.

18. The IC card as claimed in claim 14, wherein the first protruding part is shaped as a rectangle.

19. The IC card as claimed in claim 14, wherein the first protruding part is shaped as a rectangle and the second protruding part is shaped as a rectangle.

* * * * *